Oct. 13, 1970     M. H. PELAVIN     3,534,379
MULTIPLE CHANNEL ANALYSIS APPARATUS HAVING
AN AUXILIARY INDICATOR

Filed April 4, 1967     3 Sheets-Sheet 2

INVENTOR.
MILTON H. PELAVIN
BY
ATTORNEY

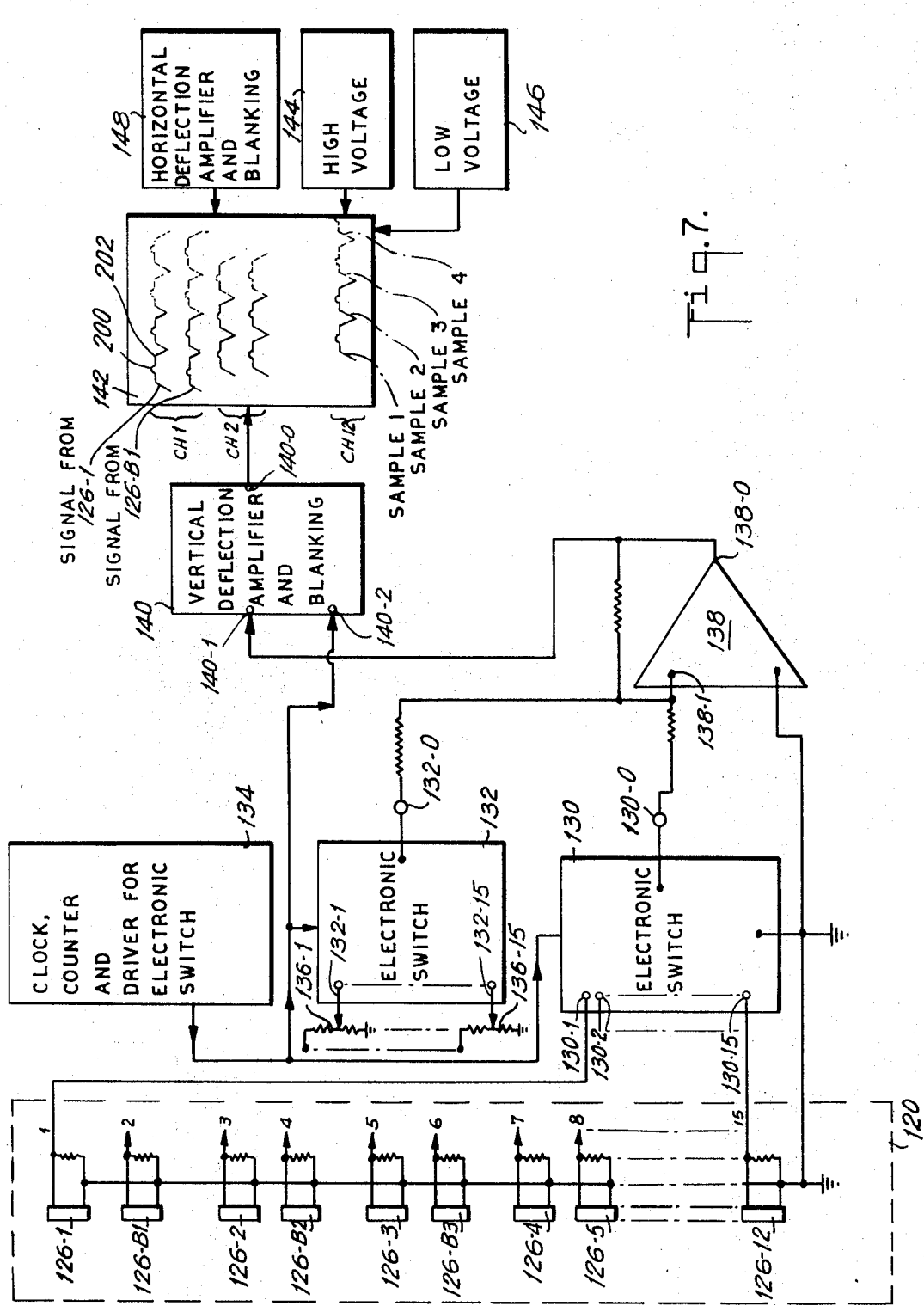

United States Patent Office 3,534,379
Patented Oct. 13, 1970

3,534,379
MULTIPLE CHANNEL ANALYSIS APPARATUS HAVING AN AUXILIARY INDICATOR
Milton H. Pelavin, White Plains, N.Y., assignor to Technicon Instruments Corporation, Ardsley, N.Y., a corporation of New York
Filed Apr. 4, 1967, Ser. No. 628,459
Int. Cl. G01d 9/04
U.S. Cl. 346—17                1 Claim

ABSTRACT OF THE DISCLOSURE

A recording, multiple channel, analysis apparatus having a plurality of analysis means, each for receiving a stream of samples and for providing a signal responsive to a characteristic thereof; primary recording means coupled to said plurality of analysis means for intermittently, successively and cyclically recording a chronological portion of each of the signals respectively provided by said plurality of analysis means, and an auxiliary indicating means such as a cathode ray tube for selective coupling to one or more or all of said plurality of analysis means for an additional chronological portion of the respective one of said signals, said additional chronological portion chronologically leading, overlapping and trailing said first mentioned respective chronological portion of said respective one of said signals.

RELATED APPLICATION

This application is a continuation-in-part of applicant's U.S. patent application Ser. No. 529,492, filed Feb. 23, 1966, and assigned to a common assignee.

BACKGROUND OF THE INVENTION

Field of the invention

This invention relates to the quantitative analysis of a plurality of fluid samples for a plurality of ingredients therein.

Description of the prior art

In the article "Multiple Automatic Sequential Analysis" by Leonard T. Skeggs, Jr. et al., in Clinical Chemistry, vol. 10, No. 10, Oct. 1964, pp. 918–936, there is discussed an apparatus which is adapted to quantitatively analyze each of a plurality of fluid samples for a plurality, such as eight, different substances or constituents therein. Briefly, each of the sample fluids, which may be a body fluid such as blood or urine, is disposed in a respective container. The containers are mounted on a movable support which automatically, sequentially, and intermittently presents each of the containers to an off-take station. An off-take tube is automatically inserted into the presented container and the sample is aspirated therefrom as a stream of fluid. The sequentially aspirated samples are formed into a continuous stream wherein each sample is spaced from the preceding sample by a segment of air. This initial stream of samples is divided into a plurality of quotient streams of samples, each quotient sample being a fractional portion of a respective sample in the initial stream. Each of the quotient streams is treated with a reagent, as taught in the U.S. Pat. No. 2,797,149 to Leonard T. Skeggs, issued June 25, 1957, to provide a color reaction which is responsive to the concentration of a predetermined substance in each respective fractional sample portion. Each of the quotient streams is passed through a respective colorimeter and the light transmittance at a predetermined wavelength of each fractional sample portion is determined and the equivalent concentration is recorded. In the embodiment shown therein, the respective colorimeters comprise a plurality of respective flow cells and a single light source and light focusing means, which are sequentially and cyclically shifted from flow cell to flow cell. The arrival times of the fractional sample portions from the same sample from the initial stream are sequentially phased so that each of these portions may be examined sequentially in a group.

It is desirable that the fractional portions of the same sample from the initial stream of samples not only arrive at their respective flow cells when such flow cells are to be read-out to the recorder, but also that the subportion of each such portion which is in the flow cell when such flow cell is being read-out be at its steady-state optical density, most frequently its maximum optical density, since it is this steady-state optical density of a treated sample which is responsive to the constituent of interest therein. To achieve this result, the running time of each of the quotient streams, from the time it leaves the off-take tube to the time it reaches its flow cell, must be accurately adjusted in phase with the other quotient streams and the means for reading out the signal to the recorder.

It is, therefore, an object of this invention to provide a means for indicating the chronological and amplitude relationships of each of the plurality of signals recorded at the primary recorder to the signal generated at the respective flow cell, to make certain that the signal responsive to the steady-state optical density is being recorded at the primary recorder.

SUMMARY

According to this invention there is provided an auxiliary indicator for continuously indicating over a first interval of time the signal generated by a quotient sample while the signal is made available to the primary recorder for a second interval of time contained within said first interval, whereby to monitor the phasing of the steady-state signal.

BRIEF DESCRIPTION OF THE DRAWING

These and other objects, advantages and features of this invention will be apparent from the following specification thereof, taken in conjunction with the accompanying drawing in which:

FIG. 7 is a schematic block diagram of another embodiment of the invention.

DESCRIPTION OF THE PREFERRED EMBODIMENTS

Figure 1:
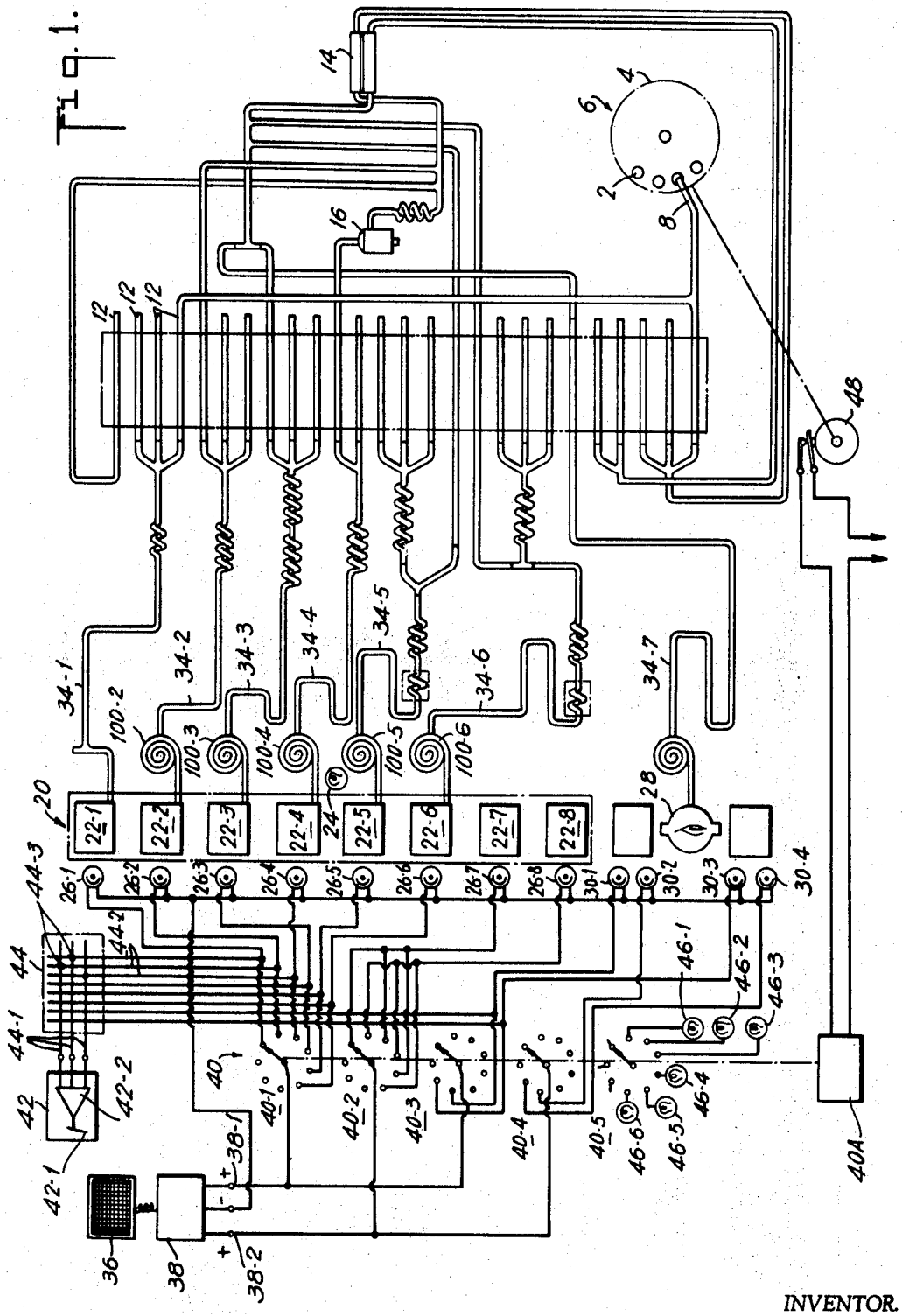
FIG. 1 is a pictorial view of an analytical system embodying this invention.
Figure 2:
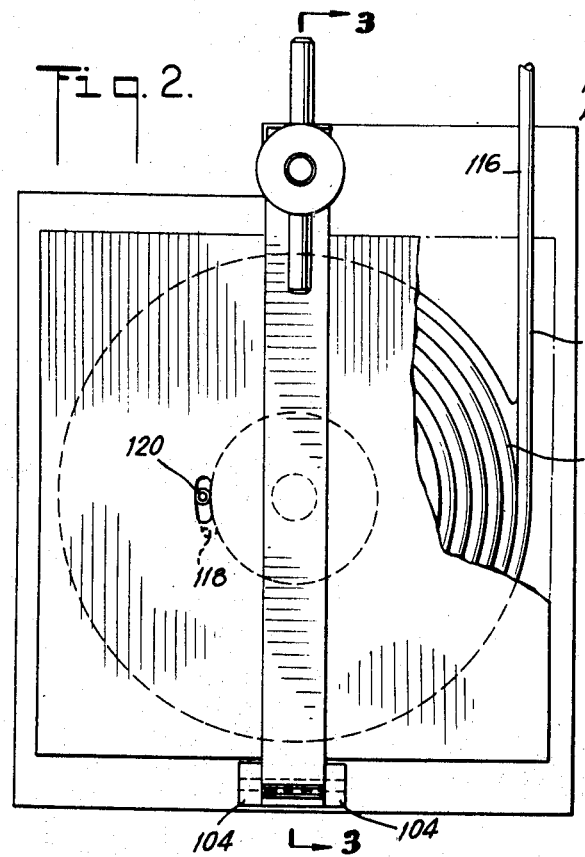
FIG. 2 is a view in elevation of a quotient stream phasing means.
Figure 3:
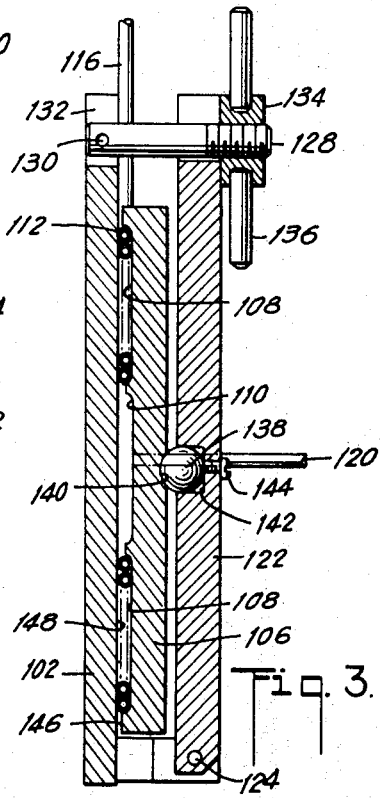
FIG. 3 is a view in elevation, in cross-section, taken along the plane 3—3 of FIG. 2.
Figure 4:
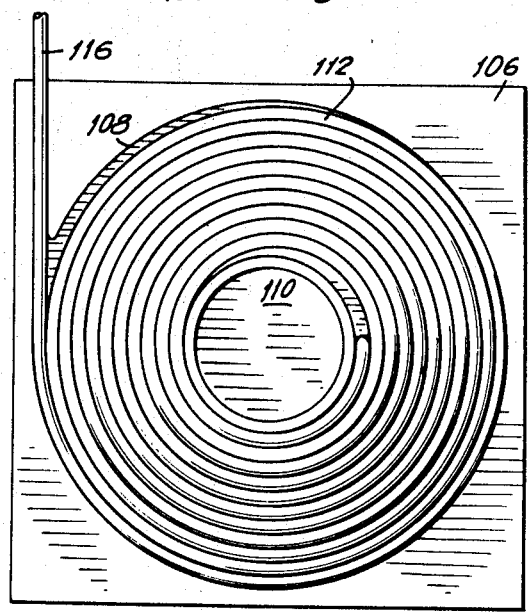
FIG. 4 is a view in elevation of a part of the phasing means of FIG. 2.
Figure 5:
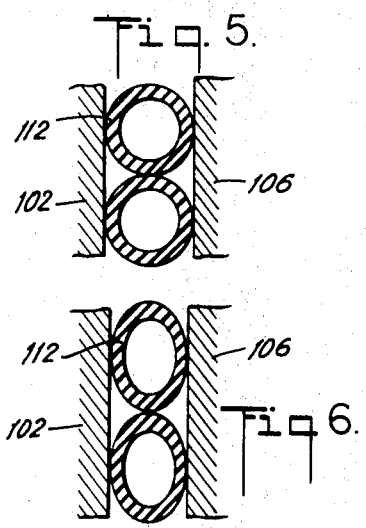
FIGS. 5 and 6 are detail views, in cross-section, of the phasing means of FIG. 2.
Figure 6:
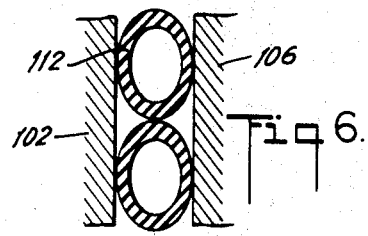

An exemplary system which provides the samples sequentially to form the initial stream of sequentially flowing samples, which divides the initial stream into a plurality of quotient streams and treats the streams for analysis, which analyzes each of the quotient streams for at least one respective constituent, and which records the results of such analysis, is shown in FIG. 1. Such a system is described in detail in the Skeggs et al. article, supra. Briefly, the samples are respectively disposed in containers 2, which are mounted on the indexible turntable 4 of a sampler assembly 6 which includes an off-take tube 8 which is inserted into each container as it is presented thereto. A peristallic type proportioning pump 10 has a plurality of pump tubes 12, which tubes are concurrently engaged by a plurality of rollers and progressively occluded along their lengths thereby. The pump tubes form part of a manifold which is effective to draw the samples through the off-take tube 8 as an initial flowing stream of sequential samples, to divide the initial stream into a plurality of quotient streams and to treat the streams for analysis, as by dailysis at 14, by gas separation at 16, by the addition of suitable reagents, to provide a color reaction which is responsive to the concentration of the constituent of interest in each quotient sample. The quotient streams are passed either to the colorimeter 20 having a plurality of flow cells 22–1 through 22–8, a light source 24, and a plurality of photodetectors 26–1 through 26–8; or to a flame spectrometer 28 having a plurality of photodetectors 30–1 through 30–4.

For example, in the colorimeter, the quotient stream in the conduit 34–1 may be analyyzed for albumin by the addition of a H.A.B.A. reagent; the quotient stream in the conduit 34–2 may be analyzed for total protein by a biuret reagent; the quotient stream in the conduit 34–3 may be analyzed for chlorides by a chloride reagent; the quotient stream in the conduit 34–4 may be analyzed for carbon dioxide by the addition of a $CO_2$ reagent after a gas separation at 16; the quotient stream in the conduit 34–5 may be analyzed for glucose by an orcinol solution; and the quotient stream in the conduit 34–6 may be analyzed for urea nitrogen by the addition of diacetyl monoxime and ferric alum reagents. The quotient stream in the conduit 34–7 may have lithium sulfate added as a standard and may be analyzed for sodium and potassium in the spectrophotometer 22.

A primary chart recorder 36, driven by null-balancing bridge 38, is utilized to cyclically record the peak value from the analysis of each quotient sample, so that the analyses of each of the quotient samples from the identical initial sample are recorded as a sequential group. To accomplish this, the running time of each of the quotient streams is respectively delayed or phased so that their peaks arrive sequentially at their respective flow cells or the spectrophotometer. A sampling switch 40 is also provided to couple the signal from a respective detector 26 associated with a respective flow cell 22 to the bridge 38. To monitor the peaking of each sample there is also provided a phasing monitoring display means, here shown as a monitoring recorder 42 which may be coupled by a switch 44 to the detectors of one or a plurality of flow cells for a full cycle of quotient samples. Thus, the monitoring recorder will trace the complete signal provided by a quotient sample from a minimum through peak to minimum, while the primary recorder only recorder only records a segment of the complete signal, which segment should include the peak.

To permit the shifting of the arrival time of each peak so that it will be passed by the sampling switch 40 to the recorder, all but one of the conduits leading to the flow cells or the spectrophotometer are each provided with means for adjustably varying the length of time it takes for the quotient stream to flow through such a conduit. Such a means is found in the variable volume conduit 100 shown in FIGS. 2 through 6, which shall be called hereinafter a phaser.

The phaser 100 comprises a flat, fixed base plate 102 having two upstanding elements 104 to serve as a hinge bracket. A movable plate 106 is disposed above the base plate 102 and has an outer annular recess 108 and an inner annular recess 110 formed therein confronting said base plate. A resiliently flexible tube 112 is formed into a flat helix and disposed in the outer annular recess 108. The turns may be joined together by a solvent or adhesive to form an integral unit. The recess 108 is provided with a tangential groove 114 to accommodate a continuation 116 of the outermost turn of the helix, and with a transverse bore 118 to accommodate a continuation 120 of the innermost turn of the helix. A bar 122 has one end thereof pivotally mounted between the brackets 104 by a pivot pin 124, and the other end thereof has a slot 126 to receive one end of a threaded rod 128. The other end of the threaded rod 128 is mounted by a pivot pin 130 in a slot 132 to the base plate 102. A nut 134 having handle projections 136 is adapted to be advanced on the rod 128 to bear against the bar 122. A ball bearing 138 is disposed in part in a spherical cavity 140 in the plate 102 and in part in a cylindrical cavity 142 in the bar 122. A machine screw 144 is disposed through the plate 122 into the cavity 142 to adjust the extent of the projection of the ball bearing from the cavity 142. It will be seen that advancement of the nut 134 on the rod 128 against the bar 122 will press the ball bearing 138 against the plate 106, compressing the resiliently flexible tube 112 between the plate 102 and the plate 106, until the confronting faces 146 and 148 of the plates 106 and 102, respectively abut. Such compression changes the normally circular cross-section area of the resilient tube 112 shown in FIG. 5 into a relatively elliptical cross-section area shown in FIG. 6. It will be appreciated that the length of the tube 112 remains unchanged, and that the internal volume contained by the tube is reduced by the compression from the maximum afforded by the circular cross-section. As the contained volume of the tube is reduced, the residence time required for a given volume of fluid driven at a given volumetric rate of flow to pass through the tube is decreased. Thus, by adjusting the relative compressions on the respective tubes, the quotient samples from the same initial sample may be delayed or advanced to arrive at their respective flow cells in the desired sequence. In lieu of the above described phaser, the phaser described in the U.S. patent application of Jack Isreeli and Leonard T. Skeggs, S.N. 529,366, filed Feb. 23, 1966, and assigned to a common assignee, may be utilized.

The sampling switch 40 comprises a rotary switch having a plurality of decks of contacts. The first contact deck 40–1 serves to couple in sequence the output signal of each of the sample photodetectors 26–1 through 26–6 associated with a respective flow cell which receives a quotient sample to one input terminal 38–1 of the null-balancing bridge 38. The second contact deck 40–2 serves to couple in sequence the output signal of a reference flow cell assembly photodetector 26–7 or 26–8 to the other input terminal 38–2 of the bridge. The third contact deck 40–3 serves to couple in sequence the output signal of the sample photocells 30–1 and 30–3 of the spectrophotometer 28 to the input terminal 38–1 of the bridge. The fourth contact deck 40–4 serves to couple in sequence the output signal of the reference photocells 30–2 and 30–4 of the spectrophotometer to the input terminal 38–2 of the bridge. The fifth contact deck 40–5 serves to illuminate in sequence each of a plurality of indicator lamps 46–1 through 46–6 to indicate which of the respective sample photodetectors is being coupled to the primary recorder 36. The sampling switch 40 is intermittently rotated, with a pause at each position to permit the readout by the respective photodetectors of the respective flow cell to the recorder 36, the respective flow cell at that time in phase having the peak of the respective sample therein, and makes one full cycle for each initial sample as provided by the sampler assembly 4. The sampler assembly 4 operates a timing cam 48 which actuates a microswitch to move the sampling switch from its "home" position. As shown in U.S. 3,241,432, the switch 40 may be driven by a geneva driver assembly 40A which is driven by a motor which is energized by a microswitch which is actuated by a multilobe cam (e.g. eight lobed), which in turn is rotated by a motor which is phased to the operation of the sampler by the cam 48.

The monitoring switch 44 serves to couple the output signals from each of the sample photodetectors of the colorimeter and the sample photodetectors of the spectrophotometer to the monitoring recorder 42. The monitoring recorder here shown is a multi-point recorder having a signal stylus 42–1 with a traversing mechanism 42–2 which is sequentially and cyclically coupled to three input channels. The switch 44 comprises three cross-bars 44–1, any of which can be coupled to any of the input channels 44–2 by contact pins 44–3. The stylus intermittently prints the output curves from three sample channels, each being a substantially smooth curve, during the interval that the primary recorder 36 is not coupled to the respective sample channel. When the primary recorder is coupled to the respective sample channel it changes the impedance of the load on the respective photodetector, changing the full scale voltage available to the monitoring recorder. Thus, the traversing mechanism of the monitoring recorder causes its stylus to shift or execute a step function in one direction when the primary recorder is switched onto this respective channel and causes its stylus to execute a step function in the reverse direction when the primary recorder is switched out of this respective channel. By this double step function, the phasing of the primary recorder sampling interval with respect to the peak or plateau of the optical density of the liquid sample in the respective channel is instantly apparent to the operator, and a permanent record thereof is also automatically created. If the phasing should be changed, the operator need merely vary the respective phaser 100. Obviously, any chart type recorder with one or more stylii may be utilized as the monitoring recorder.

A monitoring meter, not shown, may be substituted for the monitoring recorder 42. In such a case, the operator would have to observe the peak value indicated by the meter and ensure that this peak occurred during the readout of a photodetector to the recorder 36.

An electronic presentation, incorporating, for example, a cathode ray tube or an electroluminescent panel, may be utilized to provide a concurrent display of all of the channels. An embodiment having a cathode ray tube display is illustrated in FIG. 7. Here, a colorimeter 120 has fifteen channels, of which twelve are sample streams and three are blank streams. Each channel is provided with a respective photodetector 126–1, 126–B1, 126–2, 126–B2, 126–3, 126–B3, 126–4, 126–5; . . . 126–12 having a respective load resistor.

Two fifteen channel electronic switches or commutators 130 and 132 are driven in parallel by a driver or clock pulse generator 134. Each of the input terminals 130–1, 130–2 . . . 130–15 of the commutator 130 is thereby coupled sequentially and cyclically to the output terminal 130–0. Each of the input terminals 132–1, 132–2 . . . 132–15 of the commutator 132 is thereby coupled, in phase with the respective input terminals of the commutator 130, to the output terminal 132–0. Each of the input terminals 130–1 . . . 130–15 is coupled to the load resistor of a respective photodetector 126–1 . . . 126–12. Each of the input terminals 132–1 . . . 132–15 is coupled to a respective source of bias voltage, here shown as a plurality of voltage dividers 136–1 . . . 136–15, each coupled to a source which is not shown. The two output terminals 130–0 and 132–0 are both coupled to the input terminal 138–1 of a DC amplifier 138. The output terminal 138–0 of the amplifier 138 is coupled to the signal input terminal 140–1 of a vertical deflection amplifier 140, having a blanking stage, and whose output terminal 140–0 is coupled to the vertical deflection means of the cathode ray tube. The blanking stage has an input terminal 140–2 which is coupled to the output terminal of the clock pulse generator 134.

A high voltage supply 144 and a low voltage supply 146 are coupled to the cathode ray tube to supply the customary filament and acceleration voltages.

A horizontal deflection amplifier 148 having a blanking stage is coupled to the horizontal deflection means of the cathode ray tube. The horizontal amplifier may include a time base generator whose period is an integral multiple of one complete scan of the selector switch 40. Pulses may be provided by the switch driver 40A and divided down to provide a synchronizing pulse for the time base generator; or alternatively, this generator may be unsynchronized.

The cathode ray tube here shown is of the long persistence type having an image persistence of about two minutes. The sample frequency in the sample stream through a respective flow cell may be one per minute. Therefore, to display four succesive samples in each stream a horizontal sweep frequency of four minutes per cycle is provided by the horizontal deflection amplifier. The signal is blanked on the return sweep. Since the persistence of the image is only two minutes, only two successive channels will be clearly visible at any time; however, this permits the trace of the fifth sample to be written over the first sample, now faded, without visual interference.

The clock pulse generator 134 steps the commutator 130 to sequentially and cyclically couple the signals from each of the photodetectors to the input terminal 138–1 of the D.C. amplifier 138. In phase therewith, the clock pulse generator 134 steps the commutator 132 to sequentially and cyclically couple the voltages from the bias voltage sources to the input terminal 138–1. Thus, the signal from each photodetector has a different respective bias added thereto. This combined signal is coupled to the vertical deflection amplifier. Thus the signals from each photodetector are vertically spaced apart. The clock pulse generator 134 may operate, for example, at 1,500 cycles per second. In between each successive combined signal, the clock pulse generator 134 serves to actuate the blanking stage of the vertical deflection amplifier to blank the transient sweep between signals.

The photodetectors are also sequentially coupled to the main recorder 36 as shown in FIG. 1 by the stepping switch 40. When the main recorder is coupled to a particular photodetector it loads the output signal to provide a discrete step function 200 on the cathode ray trace 202.

By such a cathode ray tube presentation, the signals generated by all of the channels for a plurality of successive samples, may be concurrently displayed; and phasing of the read-out of the main recorder of each such signal may be instantly ascertained.

It will be appreciated that in lieu of the long persistence cathode ray tube described, a dark trace or other type of storage tube may be utilized, which will hold the trace on the tube screen until it is erased, for automatic repetitive viewing an erase signal can be switched in after every horizontal sweep. If desired, the trace may be left undisturbed for study by omitting the erase signal until it is required.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claim.

What is claimed is:

1. A recording, multiple channel, analysis apparatus comprising: a plurality of analysis means, each of said analysis including means for receiving a stream of samples and for providing a signal responsive to a characteristic thereof; primary recording means coupled to said plurality of analysis means for cyclically recording a portion of each of the signals provided by said plurality of analysis means; auxiliary indicating means for indicating an additional portion of the signal provided by said analysis means, said additional portion chronologically overlapping said first mentioned portion of each of said signals provided by said coupled analysis means, said primary recording means, when coupled to the same analysis means as said auxiliary indicating means, varying the electrical loading on said analysis means, thereby modifying the full scale voltage provided to said auxiliary indicating means, said auxiliary indicating means being adapted to be concurrently coupled to said plurality of analysis means, and to indicate the respective concurrent coupling of each analysis means of said group to said primary recorder means, said auxiliary indicating means comprises a cathode ray tube, commutator means for sequentially and cyclically coupling signals from each of the analysis means to said cathode ray tube, and deflecting means for spacing apart the signals from different analysis means.

No references Cited.

RONALD L. WIBERT, Primary Examiner

O. B. CHEW II, Assistant Examiner

U.S. Cl. X.R.

356—73